US012379098B1

(12) United States Patent
Clark et al.

(10) Patent No.: US 12,379,098 B1
(45) Date of Patent: Aug. 5, 2025

(54) CEILING PANEL SYSTEM AND FIXTURE ASSEMBLY FOR A CEILING PANEL SYSTEM

(71) Applicant: USG CEILINGS PLUS, LLC, Chicago, IL (US)

(72) Inventors: Allen Henry Clark, Chino, CA (US); Stephen Vincent Hettwer, Brea, CA (US); Chad Ralph Johnson, Rancho Santa Margarita, CA (US)

(73) Assignee: USG CEILINGS PLUS, LLC, Chicago, IL (US)

( * ) Notice: Subject to any disclaimer, the term of this patent is extended or adjusted under 35 U.S.C. 154(b) by 0 days.

(21) Appl. No.: 18/958,812

(22) Filed: Nov. 25, 2024

(51) Int. Cl.
*F21V 21/04* (2006.01)
*F21S 8/02* (2006.01)

(52) U.S. Cl.
CPC ............ *F21V 21/047* (2013.01); *F21S 8/026* (2013.01); *F21V 21/041* (2013.01); *F21V 21/044* (2013.01); *F21V 21/046* (2013.01)

(58) Field of Classification Search
CPC ...... F21S 8/026; F21V 21/047; F21V 21/041; F21V 21/044; F21V 21/046
USPC ........................................................ 362/147
See application file for complete search history.

(56) References Cited

U.S. PATENT DOCUMENTS

| | | | | |
|---|---|---|---|---|
| 5,045,985 | A * | 9/1991 | Russo | F21V 21/04 248/323 |
| 7,066,617 | B2 | 6/2006 | Mandy et al. | |
| 7,748,868 | B2 * | 7/2010 | Patti | F21S 8/02 362/147 |
| 9,625,133 | B2 | 4/2017 | Mandy et al. | |
| 11,280,481 | B1 * | 3/2022 | Yeats | F21S 8/043 |
| 2007/0019418 | A1 * | 1/2007 | Czech | F21V 21/30 362/364 |
| 2008/0186718 | A1 | 8/2008 | Magisano et al. | |

FOREIGN PATENT DOCUMENTS

| | | |
|---|---|---|
| CN | 203099581 U | 7/2013 |
| GB | 2586295 A | 2/2021 |
| KR | 101103258 B1 | 1/2012 |

* cited by examiner

*Primary Examiner* — Laura K Tso
(74) *Attorney, Agent, or Firm* — MARSHALL, GERSTEIN & BORUN LLP; Michael P. Furmanek

(57) ABSTRACT

A ceiling panel system includes a ceiling panel and a fixture assembly, which includes a bracket and a fixture. The bracket is mounted to the ceiling panel at a back side of the ceiling panel and has a base with a middle portion that is spaced apart from the back side of the ceiling panel and opposing side portions that extend from the middle portion and engage the back side of the ceiling panel proximate opposing edges of the ceiling panel. The fixture extends through an aperture formed in the middle portion of the bracket and is secured to the bracket such that the opposing edges of the ceiling panel carry substantially an entire weight of the fixture assembly.

20 Claims, 7 Drawing Sheets

CEILING PANEL SYSTEM AND FIXTURE ASSEMBLY FOR A CEILING PANEL SYSTEM

FIELD OF THE DISCLOSURE

This disclosure relates generally to ceiling panel systems and, more particularly, to fixture assemblies for ceiling panel systems.

BACKGROUND

Typically, ceiling panel fixtures, such as downlights, are installed into ceiling panel systems in the field. The installation of these fixtures requires them to be either mounted to a support system or ceiling framing, which is difficult and cumbersome, or mounted directly to the face panel of a ceiling panel, which can cause warping and deflection of the ceiling panel.

BRIEF SUMMARY OF THE DISCLOSURE

In one example ceiling panel system, the ceiling panel system comprises a ceiling panel and a fixture assembly. The fixture assembly comprises a bracket and a fixture. The bracket is mounted to the ceiling panel at a back side of the ceiling panel and comprises a base having a middle portion that is spaced apart from the back side of the ceiling panel and opposing side portions that extend from the middle portion and engage the back side of the ceiling panel proximate opposing edges of the ceiling panel. The fixture extends through an aperture formed in the middle portion of the bracket and is secured to the bracket such that the opposing edges of the ceiling panel carry substantially an entire weight of the fixture assembly.

In one implementation, the fixture is a downlight assembly.

In another implementation, a bezel of the downlight assembly is positioned between the middle portion of the bracket and the ceiling panel.

In another implementation, the bracket comprises opposing flanges that extend from the middle portion and each extending generally perpendicular to the middle portion between the opposing side portions.

In another implementation, the ceiling panel comprises a face plate and opposing panel side walls that extend from the face plate at the opposing edges of the ceiling panel.

In another implementation, the bracket comprises opposing bracket side walls that each extend from respective side portions of the bracket and adjacent and parallel to the opposing panel side walls.

In another implementation, at least one of the opposing panel side walls has a return portion formed along an edge of the at least one of the opposing panel side walls, opposite the face plate and at least one of the opposing bracket side walls extends between the face plate and the return portion of the at least one of the opposing panel side wall to mount the bracket to the ceiling panel.

In another implementation, the return portion of the at least one of the opposing panel side walls includes a notch and the at least one of the opposing bracket side walls includes a tab that extends into the notch in the return portion of the at least one of the opposing panel side walls to restrict longitudinal movement of the bracket relative to the ceiling panel.

In another implementation, the other of the opposing panel side walls has a return portion formed along an edge of the other of the opposing panel side walls, opposite the face plate, that includes a notch. The other of the opposing bracket side walls extends between the face plate and the return portion of the other of the opposing panel side walls to mount the bracket to the ceiling panel and includes a tab that extends into the notch in the return portion of the other of the opposing panel side walls to restrict longitudinal movement of the bracket relative to the ceiling panel.

In one example fixture assembly for a ceiling panel system, the fixture assembly comprises a bracket and a fixture. The bracket is configured to be mounted to a back side of a ceiling panel of the ceiling panel system and comprises a base having a middle portion that is configured to be spaced apart from the back side of the ceiling panel with the bracket mounted to the ceiling panel and opposing side portions that extend from the middle portion and are configured to engage the back side of the ceiling panel proximate opposing edges of the ceiling panel with the bracket mounted to the ceiling panel. The fixture extends through an aperture formed in the middle portion of the bracket and is secured to the bracket.

In one implementation, the fixture is a downlight assembly.

In another implementation, a bezel of the downlight assembly is configured to be positioned between the middle portion of the bracket and the ceiling panel with the fixture assembly mounted to the ceiling panel.

In another implementation, the bracket comprises opposing flanges that extend from the middle portion and that each extending generally perpendicular to the middle portion between the opposing side portions.

In another implementation, the bracket comprises opposing bracket side walls that each extend from respective side portions of the bracket and are configured to be positioned adjacent and parallel to opposing panel side walls of the ceiling panel with the bracket mounted to the ceiling panel.

In another implementation, at least one of the opposing bracket side walls is configured to extend between a face plate of the ceiling panel and a return portion of a panel side wall of the ceiling panel with the bracket mounted to the ceiling panel.

In another implementation, the at least one of the opposing bracket side walls includes a tab that is configured to extend into a notch in the return portion of the panel side wall of the ceiling panel to restrict longitudinal movement of the bracket relative to the ceiling panel.

In another implementation, each of the opposing bracket side walls is configured to extend between a face plate of the ceiling panel and a return portion of a respective panel side wall of the ceiling panel with the bracket mounted to the ceiling panel.

In another implementation, each of the opposing bracket side walls includes a tab that is configured to extend into a corresponding notch in the return portion of the respective panel side wall of the ceiling panel to restrict longitudinal movement of the bracket relative to the ceiling panel.

In one example bracket for a fixture assembly for a ceiling panel system, the bracket comprises a middle portion, opposing side portions, opposing flanges, and opposing bracket side walls. The middle portion is generally planar and includes an aperture configured to receive a fixture The middle portion is configured to be spaced apart from a back side of a ceiling panel of the ceiling panel system with the bracket mounted to the ceiling panel. The opposing side portions are generally planar and extend from opposing lateral edges of the middle portion and non-parallel to the middle portion. Terminal ends of each of the opposing side portions are configured to engage the back side of the ceiling panel proximate opposing edges of the ceiling panel with the bracket mounted to the ceiling panel. The opposing flanges are generally planar and extend from opposing fore and aft edges of the middle portion. The opposing flanges each extend generally perpendicular to the middle portion between the opposing side portions. The opposing bracket side walls are generally planar and each extends from the terminal end of a respective side portion of the bracket. The opposing bracket side walls are configured to be positioned adjacent and parallel to respective opposing panel side walls of the ceiling panel with the bracket mounted to the ceiling panel.

In one implementation, each of the opposing bracket side walls includes a tab that is configured to extend into a corresponding notch in a return portion of a respective panel side wall of the ceiling panel to restrict longitudinal movement of the bracket relative to the ceiling panel with the bracket mounted to the ceiling panel.

DETAILED DESCRIPTION

The example ceiling panel systems, fixture assemblies, and brackets disclosed herein address the drawbacks noted above. The example ceiling panel systems include a ceiling panel and a fixture assembly mounted to the ceiling panel. The fixture assembly includes a bracket that has a raised middle portion with an aperture for receiving a part of a fixture (e.g., a downlight). The raised middle portion provides a space between the middle portion of the bracket and a face plate of the ceiling panel in order to prevent the face plate from supporting the weight of the fixture assembly and, in some examples, to receive a portion of the fixture (e.g., a bezel of a downlight). Opposing side portions of the bracket (e.g., one on each side of the middle portion) extend out to and engage opposite side edges of the ceiling panel. So configured, the side edges of the ceiling panel, which are inherently stronger than the face plate, are configured to carry substantially an entire weight of the fixture assembly. This advantageously keeps the weight of the fixture assembly off of the face plate of the ceiling panel to avoid deflection of the face plate of the ceiling panel.

In some implementations, terminal ends of the side portions can have bracket side walls that can snap into the ceiling panel. In other implementations, the bracket side walls can be secured to panel side walls of the ceiling panel. In the implementations where the bracket side walls snap into the ceiling panel, the bracket side walls can include raised tabs to lock the bracket of the fixture assembly in place in the ceiling panel. This provides a secure fit of the fixture assembly with no additional hardware or independent suspension required, and can allow the fixture assembly (e.g., downlight) to be integrated into the ceiling panel systems, saving time and money for installers and the customers.

Figure 1:
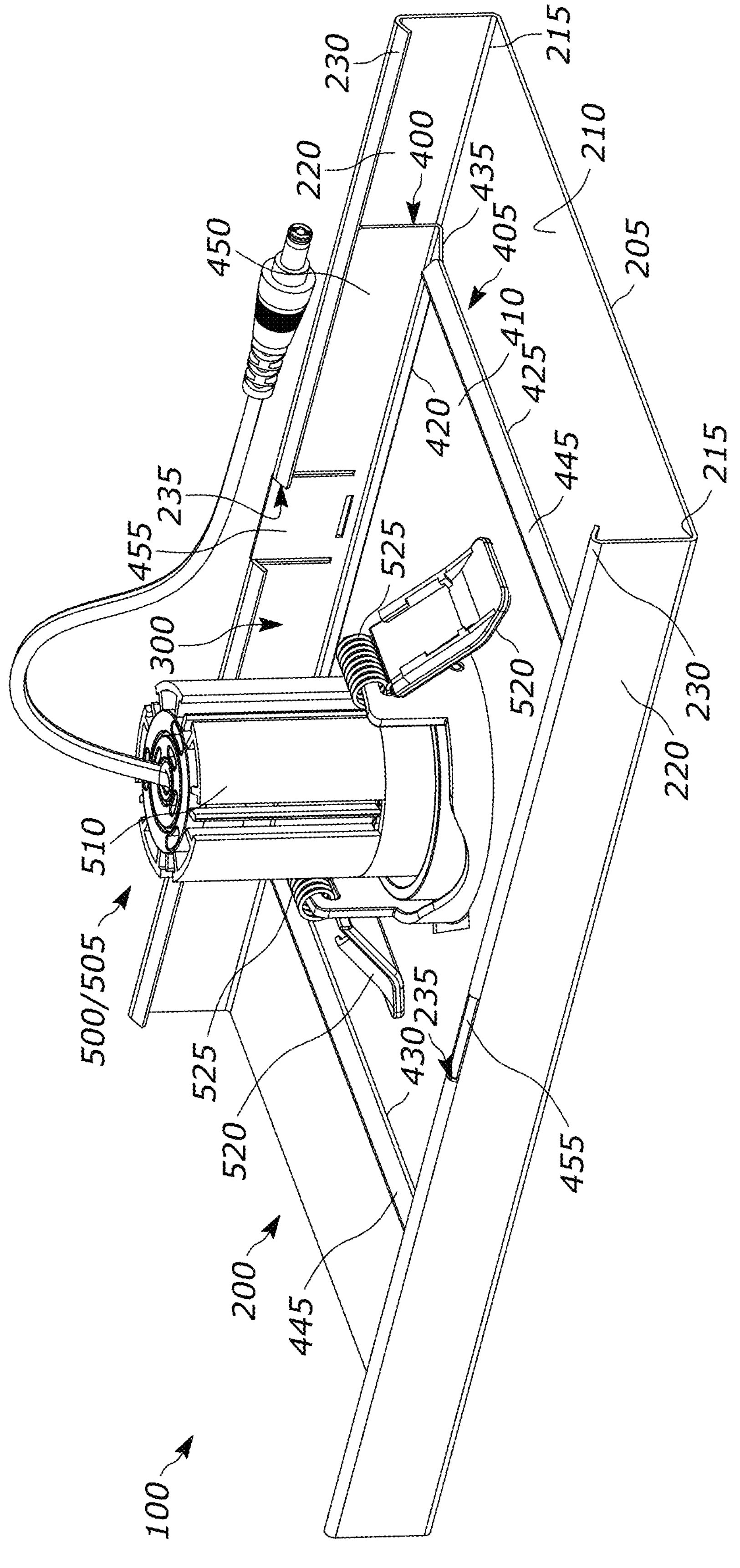
FIG. 1 illustrates a perspective view of an example ceiling panel assembly.
Figure 2:
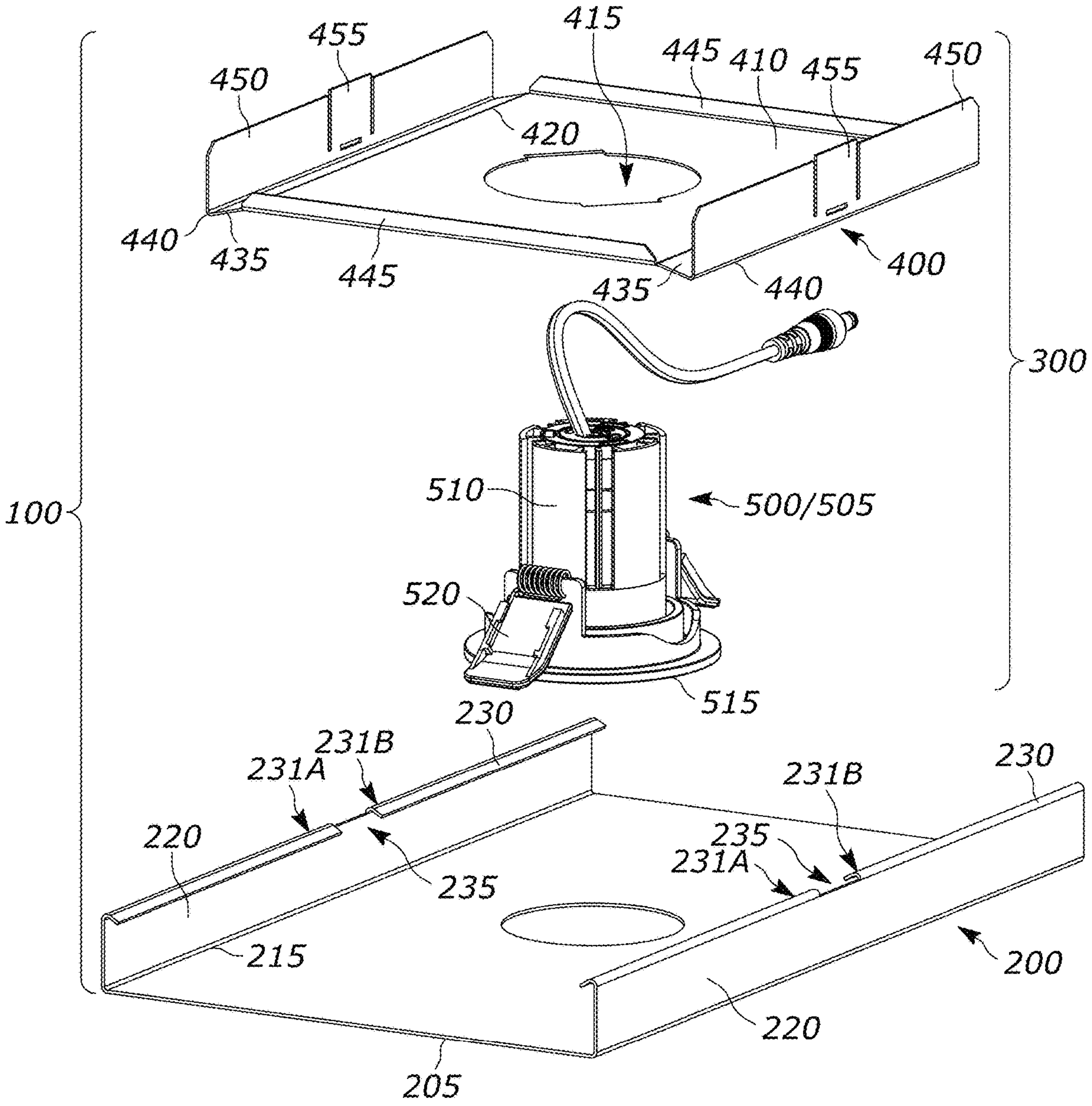
FIG. 2 illustrates an exploded perspective view of the ceiling panel assembly of FIG. 1.
Figure 3:
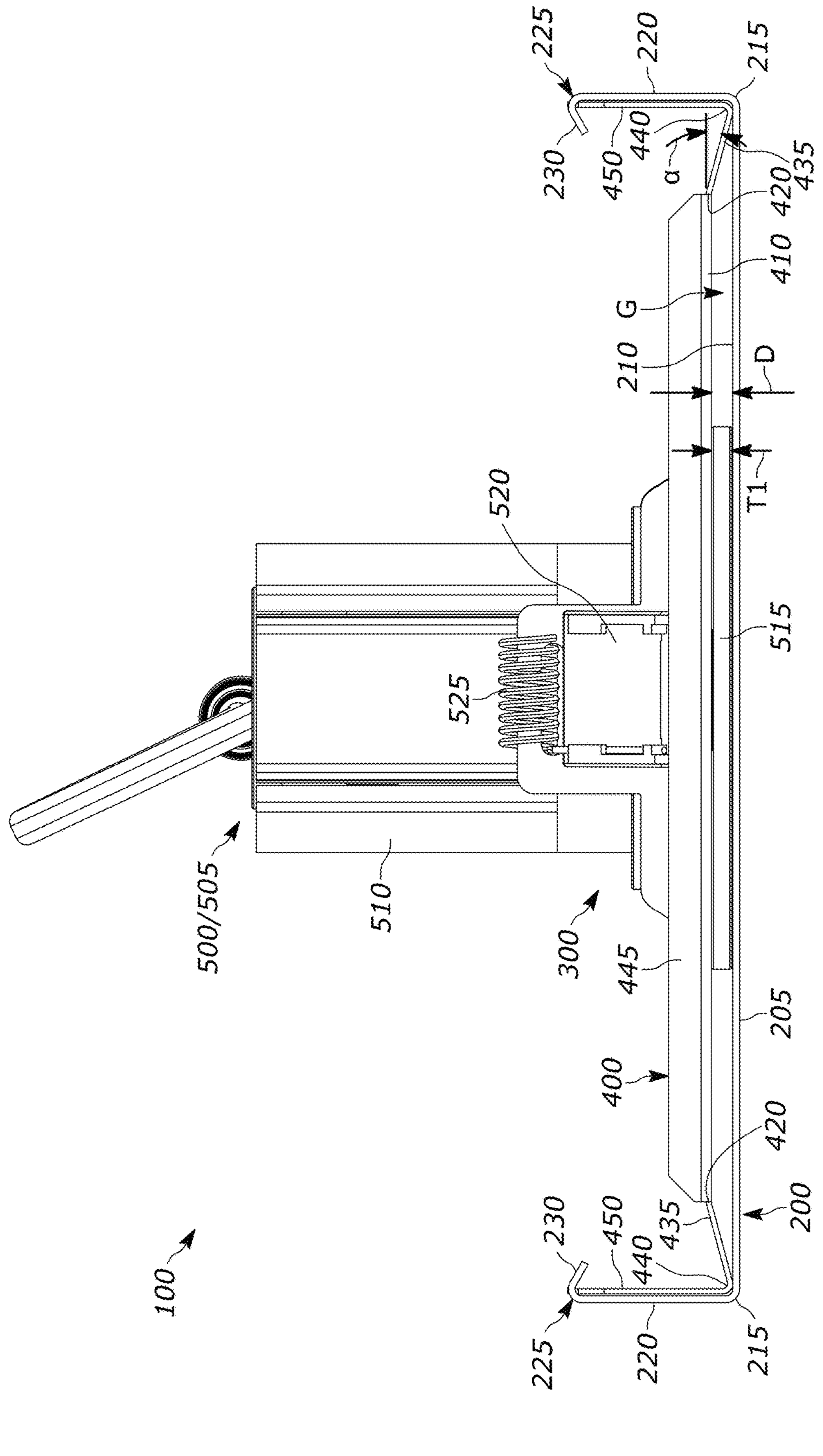
FIG. 3 illustrates a front view of the ceiling panel assembly of FIG. 1.

Referring to FIGS. 1-3, an example ceiling panel system 100 generally includes a ceiling panel 200 (e.g., a metal ceiling panel) and a fixture assembly 300 mounted to ceiling panel 200. In the implementation shown, ceiling panel 200 includes a face plate 205 that is generally planar and has a back side 210. Opposing panel side walls 220 extend from face plate 205 at opposing edges 215 of ceiling panel 200, extend generally perpendicular to face plate 205, and each have a return portion 230 formed along an edge 225 of opposing panel side walls 220, opposite face plate 205. Referring to FIGS. 6A-D, in other implementations, alternative ceiling panel configurations are possible. In one implementation (FIG. 6A), ceiling panel 200A of ceiling panel system 100A can have a face plate 205A and no panel side walls. In another implementation (FIG. 6B), ceiling panel 200B of ceiling panel system 100B can have a face plate 205B with opposing panel side walls 220B that extend perpendicular to face plate 205B, where only one of opposing panel side walls 220B includes a return portion 230B. In another implementation (FIG. 6C), ceiling panel 2000 of ceiling panel system 1000 can have a face plate 205C with opposing panel side walls 220C that extend non-perpendicular to face plate 205C, where each of opposing panel side walls 220C (or at least one) includes a return portion 230C, which can be directed inward towards face plate 205C or outward away from face plate 205C, as illustrated. In another implementation (FIG. 6D), ceiling panel 200D of ceiling panel system 100D can have a face plate 205D with opposing panel side walls 220D that extend perpendicular to face plate 205D, where opposing panel side walls 220D do not have a return portion. Other ceiling panel configurations are also possible.

Figure 4:
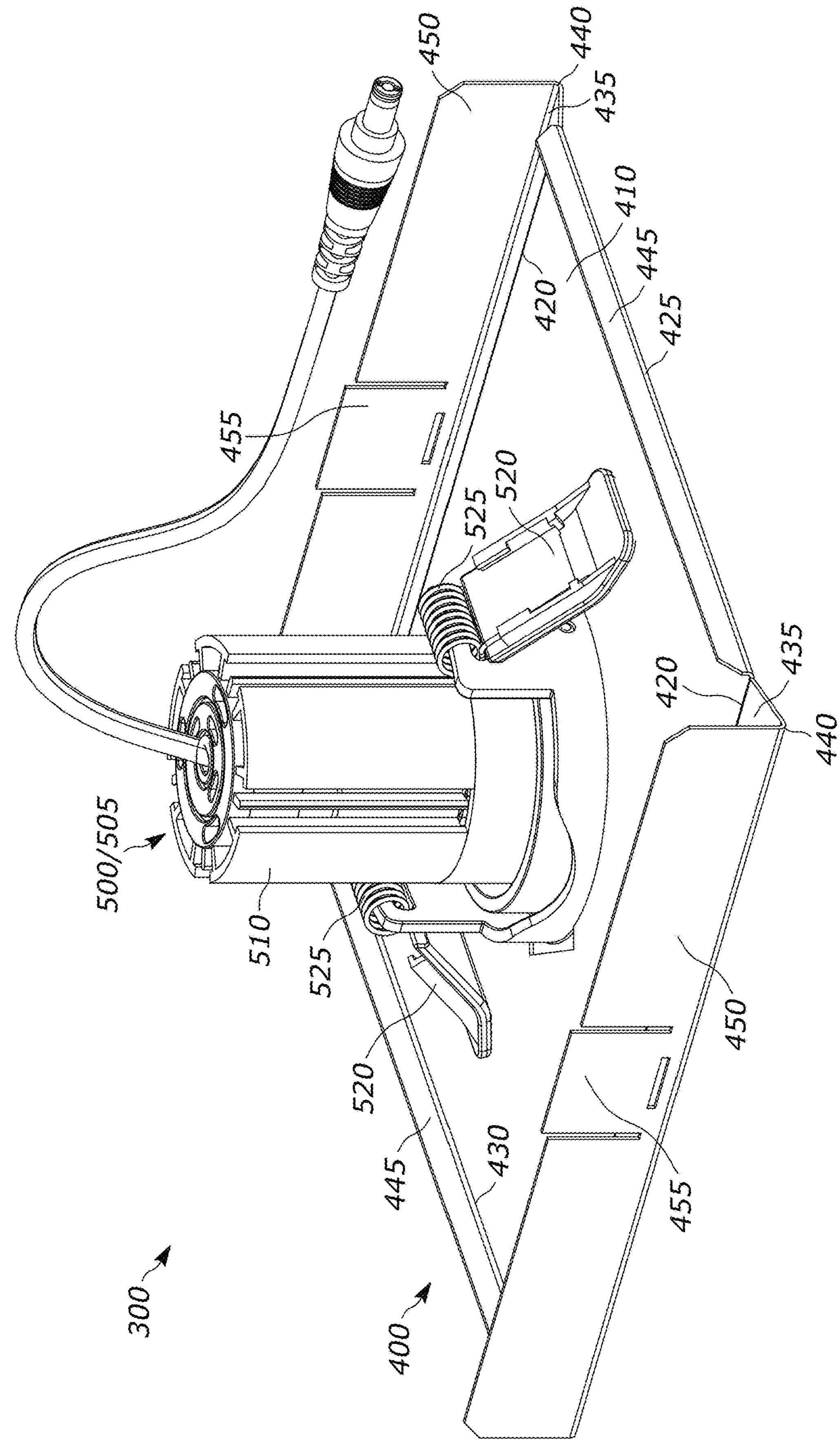
FIG. 4 illustrates a perspective view of an example fixture assembly of the ceiling panel assembly of FIG. 1.
Figure 5:
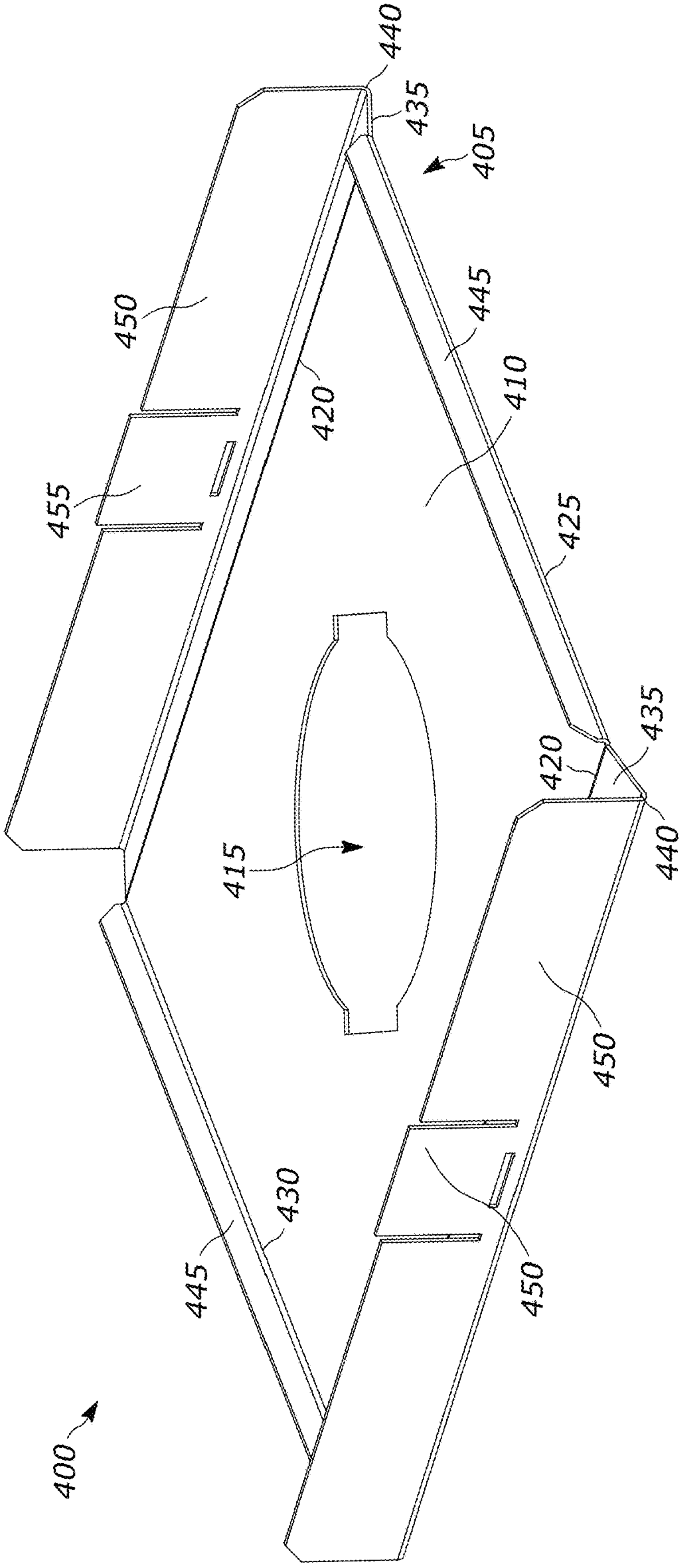
FIG. 5 illustrates a perspective view of an example bracket of the fixture assembly of FIG. 4.
Figure 6A:
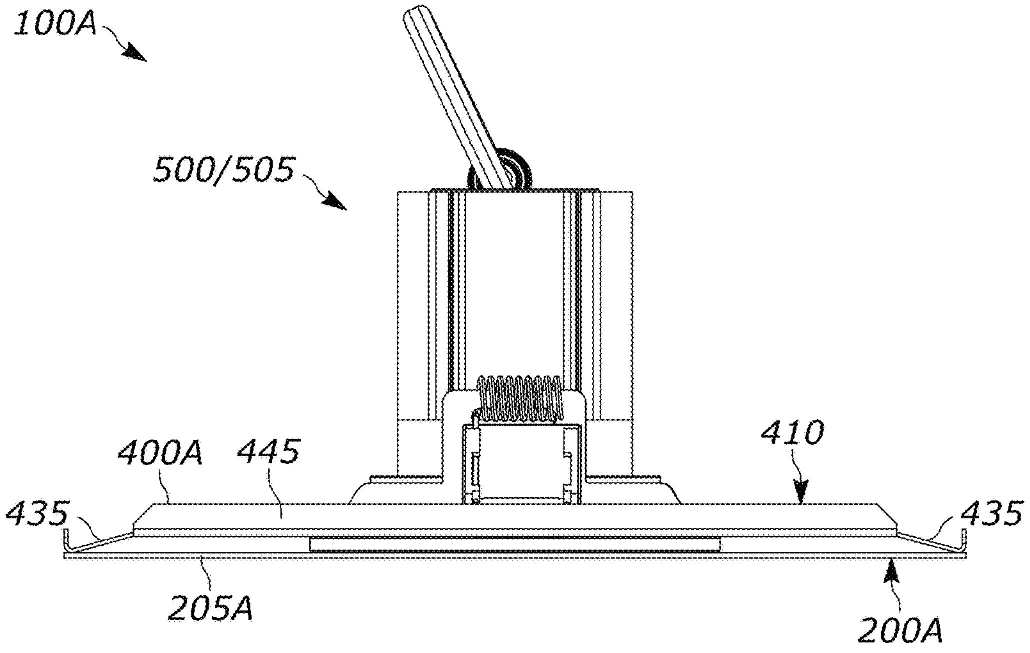
FIG. 6A illustrates a front view of a second example ceiling panel assembly.
Figure 6B:
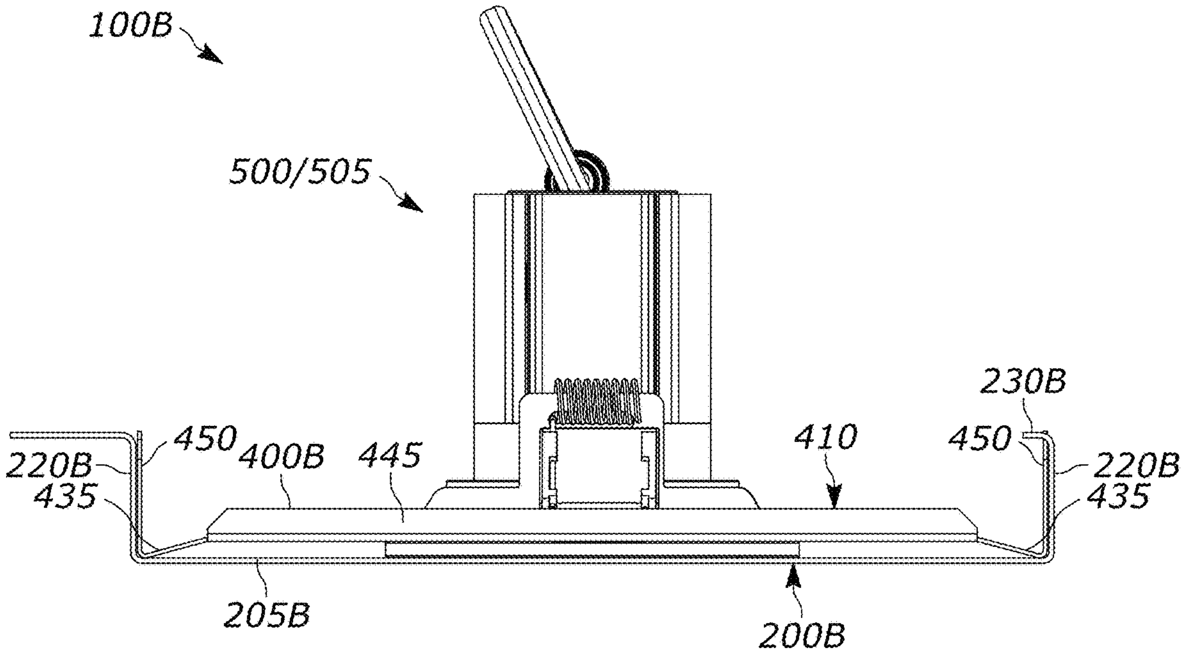
FIG. 6B illustrates a front view of a third example ceiling panel assembly.
Figure 6C:
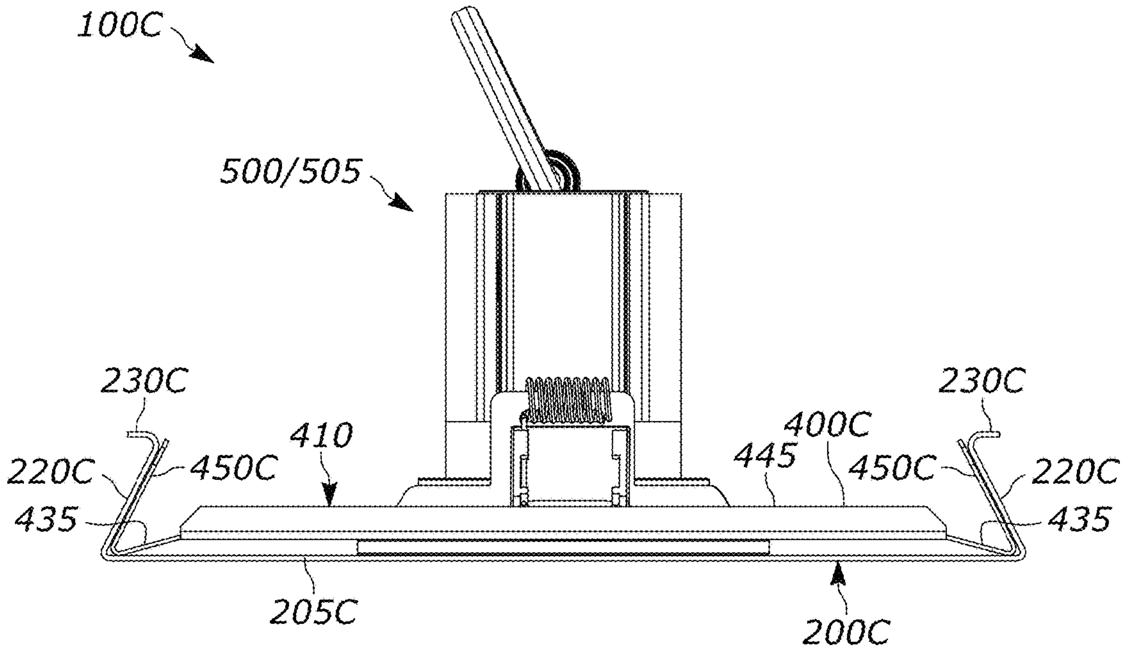
FIG. 6C illustrates a front view of a fourth example ceiling panel assembly.
Figure 6D:
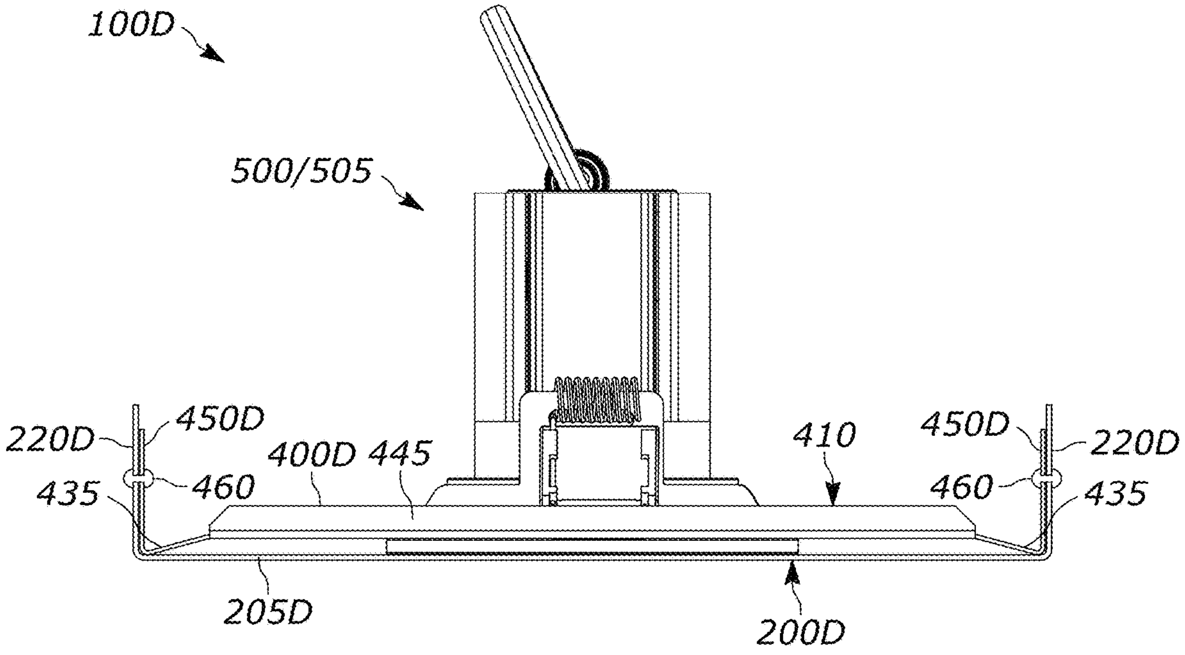
FIG. 6D illustrates a front view of a fifth example ceiling panel assembly.

Referring back to FIGS. 1-4, fixture assembly 300 generally includes a bracket 400, which is mounted to ceiling panel 200 at back side 210 of ceiling panel 200, and a fixture 500, which is secured to bracket 400. Referring generally to FIGS. 4 and 5, bracket 400 of fixture assembly 300 has a base 405 that has a middle portion 410 and opposing side portions 435. In the implementation shown, middle portion 410 of bracket 400 is generally planar and, when assembled with ceiling panel 200 (see, e.g., FIG. 3), is spaced apart a distance D from back side 210 of ceiling panel 200, resulting in a gap G between middle portion 410 of bracket 400 and back side 210 of ceiling panel 200. Gap G can provide space for any portion of fixture 500 (e.g., a bezel 515 of a downlight) that may be disposed below middle portion 410 of bracket 400. Gap G also ensures that at least middle portion 410 of bracket 400 does not bear against back side 210 of ceiling panel 200. Opposing side portions 435 of bracket 400 are also generally planar and extend from opposing lateral edges 420 of middle portion 410 of bracket 400 and non-parallel to middle portion 410. In the implementation shown, opposing side portions 435 extend linearly away from middle portion 410 at an angle $\alpha$ relative to middle portion 410. In other implementations, opposing side portions 435 could include other structures that extend at different angles from middle portion 410 and/or could include non-planar geometries. Terminal ends 440 of opposing side portions 435 engage back side 210 of ceiling panel 200 at or near opposing edges 215 of ceiling panel 200. So configured, bracket 400 disperses substantially the entire weight of fixture assembly 300 to the opposing edges 215 of ceiling panel 200 to mitigate and/or prevent deflection of face plate 205. In the implementation shown, middle portion 410 also includes an aperture 415 (see, e.g., FIG. 5) that is configured to receive fixture 500, as described in more detail below.

Bracket 400 can also include opposing flanges 445 that extend from fore and aft edges 425, 430 of middle portion 410. In the implementation shown, opposing flanges 445 are generally planar and each extends generally perpendicular to middle portion 410 between opposing side portions 435. Opposing flanges 445 can provide extra strength and stiffness to middle portion 410 to carry the weight of fixture 500 and fixture assembly 300 to the opposing edges 215 of ceiling panel 200. In other implementations, opposing flanges 445 could include geometries different from those specifically disclosed and/or bracket 400 could include different structures for increasing its strength.

In the implementation shown in FIGS. 1-5, bracket 400 also includes opposing bracket side walls 450 that extend from terminal ends 440 of respective opposing side portions 435 of bracket 400 and adjacent and parallel to opposing panel side walls 220. Opposing bracket side walls 450 are generally planar and, when bracket 400 is assembled with ceiling panel 200, extend between face plate 205 and return portion 230 of opposing panel side walls 220 to mount bracket 400 to ceiling panel 200. As shown in FIGS. 6A-D, additional bracket configurations are also possible. In one implementation (FIG. 6A), bracket 400A can have middle portion 410, opposing side portions 435, and opposing flanges 445, but no opposing bracket side walls. In this implementation, bracket 400A can be secured to ceiling panel 200A through other securing means, such as rivets, screws, adhesive, etc. In another implementation (FIG. 6B), bracket 400B can have middle portion 410, opposing side portions 435, opposing flanges 445, and opposing bracket side walls 450, but only one of opposing bracket side walls 450 is captured by a return portion 230B of one of opposing panel side walls 220B. In another implementation (FIG. 6C), bracket 4000 can have middle portion 410, opposing side portions 435, opposing flanges 445, and opposing bracket side walls 450C that extend non-perpendicular to middle portion 410 and face plate 205C. In another implementation (FIG. 6D), bracket 400D can have middle portion 410, opposing side portions 435, opposing flanges 445, and opposing bracket side walls 450D, which do not include tabs. In this implementation, bracket 400D can be secured to ceiling panel 200D through other securing means, such as rivets 460 through opposing bracket side walls 450D and panel side walls 220D. Other securing means are also possible, such as screws, adhesive, etc. Other bracket configurations are also possible.

Referring again to FIGS. 1-5, in the implementation shown, return portion 230 of opposing panel side walls 220 each include a notch 235 (see, e.g., FIG. 2) and opposing bracket side walls 450 each include a tab 455 (see, e.g., FIG. 2). In the implementation shown, each notch 235 is defined by a break in the corresponding return portion 230. That is, each return portion 230 includes a pair of opposite ends 231A, 231B defining the corresponding notch 235. Upon assembly, each tab 455 extends into a corresponding notch 235 in return portion 230 (see, e.g., FIG. 1) to restrict longitudinal movement of bracket 400 relative to ceiling panel 200. More specifically, each tab 455 includes a vertical dimension that is greater than a vertical dimension of the corresponding opposing panel side wall 220 such that tab 455 extends into notch 235 and movement of bracket 400 in the longitudinal direction is restricted by engagement between tab 455 and opposite ends 231A, 231B of return portion 230. In implementations where only one panel side wall includes a return portion (e.g., FIG. 6B), the return portion of the one panel side wall can have a notch and the corresponding bracket side wall can have a tab. While the implementation shown includes tabs 455 and notches 235, other implementations may not include tabs 455 and notches 235, but rather, the longitudinal position of the bracket 400 may be secured with friction generated between bracket 400 the ceiling panel 200. In other implementations without tabs 455 and notches 235, the longitudinal position of the bracket 400 may be secured with other securing means, such as rivets, screws, adhesive, etc. coupling bracket 400 to ceiling panel 200.

Fixture 500 of fixture assembly 300 extends through aperture 415 formed in middle portion 410 of bracket 400 and is secured to bracket 400. Fixture 500 can be any type of fixture that can be supported by a ceiling panel, such as a downlight, an environmental sensor, mechanical or electrical fixtures, a plumbing fixture (e.g., a sprinkler), an HVAC fixture (e.g., a vent, an air diffuser, etc.), a speaker, etc. In the implementation shown, fixture 500 is a downlight assembly 505 that generally includes a housing 510 with an illumination source (not shown), a bezel 515, and a pair of arms 520 that are rotatably attached to bezel 515. To secure downlight assembly 505 to bracket 400, arms 520 of downlight assembly 505 are raised into a position where arms 520 are generally parallel to housing 510. Housing 510 of downlight assembly 505 is then inserted, from the bottom, through aperture 415 in middle portion 410 of bracket 400 until bezel 515 engages a bottom surface of middle portion 410. In the implementation shown, bezel 515 includes a diameter that is larger than a diameter of aperture 415. Arms 520 can then be released and torsion springs 525 (see, e.g., FIG. 1) bias arms 520 downward and against a top surface of middle portion 410 of bracket 400 to secure downlight assembly 505 to bracket 400. Once downlight assembly 505 is secured to bracket 400, fixture assembly 300 can be mounted to ceiling panel 200 such that bezel 515 of downlight assembly 505 is positioned in gap G between middle portion 410 of bracket 400 and ceiling panel 200. In the implementation shown, bezel 515 includes a thickness dimension T1 that is smaller than distance D between middle portion 410 and face plate 205 such that bezel 515 does not rest on back side 210 of face plate 205 of ceiling panel 200. In other implementations, thickness dimension T1 of bezel 515 can be substantially equal to distance D. In still other implementation, fixture 500 does not include bezel 515.

The figures and description provided herein depict and describe one example for purposes of illustration only. One skilled in the art will readily recognize from the foregoing discussion that alternative embodiments of the components illustrated herein may be employed without departing from the principles described herein. Thus, upon reading this disclosure, those of skill in the art will appreciate still additional alternative structural and functional designs. Thus, while particular examples and applications have been illustrated and described, it is to be understood that the disclosed examples are not limited to the precise construction and components disclosed herein. Various modifications, changes, and variations, which will be apparent to those skilled in the art, may be made in the arrangement, operation and details of the methods and components disclosed herein without departing from the spirit and scope defined in the appended claims.

What is claimed is:

1. A ceiling panel system, comprising:
a ceiling panel; and
a fixture assembly, comprising:
a bracket mounted to the ceiling panel at a back side of the ceiling panel, the bracket comprising a base having a middle portion that is spaced apart from the back side of the ceiling panel and opposing side portions that extend from the middle portion and engage the back side of the ceiling panel proximate opposing edges of the ceiling panel; and
a fixture extending through an aperture formed in the middle portion of the bracket and secured to the bracket such that the opposing edges of the ceiling panel carry substantially an entire weight of the fixture assembly.

2. The ceiling panel system of claim 1, wherein the fixture is a downlight assembly.

3. The ceiling panel system of claim 2, wherein a bezel of the downlight assembly is positioned between the middle portion of the bracket and the ceiling panel.

4. The ceiling panel system of claim 1, wherein the bracket comprises opposing flanges that extend from the middle portion, the opposing flanges each extending generally perpendicular to the middle portion between the opposing side portions.

5. The ceiling panel system of claim 1, wherein the ceiling panel comprises a face plate and opposing panel side walls that extend from the face plate at the opposing edges of the ceiling panel.

6. The ceiling panel system of claim 5, wherein the bracket comprises opposing bracket side walls that each extend from respective side portions of the bracket and adjacent and parallel to the opposing panel side walls.

7. The ceiling panel system of claim 6, wherein:
at least one of the opposing panel side walls has a return portion formed along an edge of the at least one of the opposing panel side walls, opposite the face plate; and
at least one of the opposing bracket side walls extends between the face plate and the return portion of the at least one of the opposing panel side walls to mount the bracket to the ceiling panel.

8. The ceiling panel system of claim 7, wherein:
the return portion of the at least one of the opposing panel side walls includes a notch; and
the at least one of the opposing bracket side walls includes a tab that extends into the notch in the return portion of the at least one of the opposing panel side walls to restrict longitudinal movement of the bracket relative to the ceiling panel.

9. The ceiling panel system of claim 8, wherein:
the other of the opposing panel side walls has a return portion formed along an edge of the other of the opposing panel side walls, opposite the face plate, the return portion formed in the edge of the other of the opposing panel side walls including a notch; and
the other of the opposing bracket side walls extends between the face plate and the return portion of the other of the opposing panel side walls to mount the bracket to the ceiling panel, the other of the opposing bracket side walls including a tab that extends into the notch in the return portion of the other of the opposing panel side walls to restrict longitudinal movement of the bracket relative to the ceiling panel.

10. A fixture assembly for a ceiling panel system, comprising:
a bracket configured to be mounted to a back side of a ceiling panel of the ceiling panel system, the bracket comprising a base having a middle portion that is configured to be spaced apart from the back side of the ceiling panel with the bracket mounted to the ceiling panel and opposing side portions that extend from the middle portion and are configured to engage the back side of the ceiling panel proximate opposing edges of the ceiling panel with the bracket mounted to the ceiling panel; and
a fixture extending through an aperture formed in the middle portion of the bracket and secured to the bracket.

11. The fixture assembly of claim 10, wherein the fixture is a downlight assembly.

12. The fixture assembly of claim 11, wherein a bezel of the downlight assembly is configured to be positioned between the middle portion of the bracket and the ceiling panel with the fixture assembly mounted to the ceiling panel.

13. The fixture assembly of claim 10, wherein the bracket comprises opposing flanges that extend from the middle portion, the opposing flanges each extending generally perpendicular to the middle portion between the opposing side portions.

14. The fixture assembly of claim 10, wherein the bracket comprises opposing bracket side walls that each extend from respective side portions of the bracket and are configured to be positioned adjacent and parallel to opposing panel side walls of the ceiling panel with the bracket mounted to the ceiling panel.

15. The fixture assembly of claim 14, wherein at least one of the opposing bracket side walls is configured to extend between a face plate of the ceiling panel and a return portion of a panel side wall of the ceiling panel with the bracket mounted to the ceiling panel.

16. The fixture assembly of claim 15, wherein the at least one of the opposing bracket side walls includes a tab that is configured to extend into a notch in the return portion of the panel side wall of the ceiling panel to restrict longitudinal movement of the bracket relative to the ceiling panel.

17. The fixture assembly of claim 14, wherein each of the opposing bracket side walls is configured to extend between a face plate of the ceiling panel and a return portion of a respective panel side wall of the ceiling panel with the bracket mounted to the ceiling panel.

18. The fixture assembly of claim 17, wherein each of the opposing bracket side walls includes a tab that is configured to extend into a corresponding notch in the return portion of the respective panel side wall of the ceiling panel to restrict longitudinal movement of the bracket relative to the ceiling panel.

19. A bracket for a fixture assembly for a ceiling panel system, the bracket comprising:
a middle portion that is generally planar and includes an aperture configured to receive a fixture, wherein the middle portion is configured to be spaced apart from a back side of a ceiling panel of the ceiling panel system with the bracket mounted to the ceiling panel;
opposing side portions that are generally planar and extend from opposing lateral edges of the middle portion and non-parallel to the middle portion, wherein terminal ends of each of the opposing side portions are configured to engage the back side of the ceiling panel proximate opposing edges of the ceiling panel with the bracket mounted to the ceiling panel;

opposing flanges that are generally planar and extend from opposing fore and aft edges of the middle portion, wherein the opposing flanges each extending generally perpendicular to the middle portion between the opposing side portions; and opposing bracket side walls that are generally planar and that each extends from the terminal end of a respective side portion of the bracket, wherein the opposing bracket side walls are configured to be positioned adjacent and parallel to respective opposing panel side walls of the ceiling panel with the bracket mounted to the ceiling panel.

20. The bracket of claim 19, wherein each of the opposing bracket side walls includes a tab that is configured to extend into a corresponding notch in a return portion of a respective panel side wall of the ceiling panel to restrict longitudinal movement of the bracket relative to the ceiling panel with the bracket mounted to the ceiling panel.

* * * * *